United States Patent [19]

Chisnell et al.

[11] Patent Number: 5,044,671
[45] Date of Patent: Sep. 3, 1991

[54] SWAGED-TYPE FLEXIBLE HOSE COUPLING

[75] Inventors: Jerry H. Chisnell, Northville; Myles E. Davis, Milford; Steven J. Dashevich, Novi, all of Mich.

[73] Assignee: S & H Fabricating and Engineering Incorporated, Lake Mary, Fla.

[21] Appl. No.: 541,585

[22] Filed: Jun. 21, 1990

[51] Int. Cl.$^5$ ............................................. F16L 55/00
[52] U.S. Cl. ..................................... 285/55; 285/256
[58] Field of Search ................. 285/55, 256, 259, 149

[56] References Cited

U.S. PATENT DOCUMENTS

| | | | |
|---|---|---|---|
| 1,825,005 | 9/1931 | Loughead | 285/256 |
| 2,008,650 | 7/1935 | Weatherhead, Jr. | 285/55 X |
| 2,453,997 | 11/1948 | MacWilliam | 285/84 |
| 2,572,645 | 10/1951 | Melsom | 285/84 |
| 2,797,111 | 6/1957 | Beazley | 285/149 |
| 3,073,628 | 1/1963 | Cline et al. | 285/259 X |
| 3,224,794 | 12/1965 | Crissy | 285/259 X |
| 3,578,360 | 5/1971 | Eliot | 285/55 |
| 3,794,360 | 2/1974 | Bachle et al. | 285/256 |
| 3,915,480 | 10/1975 | Kish et al. | 285/174 |
| 3,990,729 | 11/1976 | Szentmihaly | 285/109 |
| 4,005,880 | 2/1977 | Anderson et al. | 285/47 |
| 4,039,212 | 8/1977 | Skarud | 285/253 |
| 4,106,526 | 8/1978 | Szentmihaly | 138/109 |
| 4,111,469 | 9/1978 | Kavick | 285/286 |
| 4,114,656 | 9/1978 | Kish | 138/109 |
| 4,142,554 | 3/1979 | Washkewicz et al. | 138/109 |
| 4,226,446 | 10/1980 | Burrington | 285/256 |
| 4,305,608 | 12/1981 | Stuemky et al. | 285/256 |
| 4,369,992 | 1/1983 | Fournier et al. | 285/256 |
| 4,392,678 | 6/1983 | Adamczyk | 285/256 |
| 4,478,435 | 10/1984 | Cheshier et al. | 285/918 |
| 4,522,435 | 6/1985 | Miller et al. | 285/256 |
| 4,593,942 | 6/1986 | Loker | 285/253 |
| 4,729,583 | 3/1988 | Lalikos et al. | 285/149 |

FOREIGN PATENT DOCUMENTS

| | | |
|---|---|---|
| 1164770 | 3/1964 | Fed. Rep. of Germany . |
| 2430665 | 1/1976 | Fed. Rep. of Germany . |
| 2506874 | 8/1976 | Fed. Rep. of Germany . |
| 1083741 | 9/1967 | United Kingdom . |

*Primary Examiner*—Dave W. Arola
*Assistant Examiner*—Heather Chun
*Attorney, Agent, or Firm*—Brooks & Kushman

[57] ABSTRACT

A hose coupling assembly for use particularly in an automotive air conditioning system, or other system requiring the effective sealing of a refrigerant over extended periods of time, comprising a hose having an inner liner of thermoplastic material and being maintained in compression by a swaged sleeve over a fitting having a primary sealing element in the form of a resilient O-ring and a plurality of locking grooves into which the thermoplastic liner is to be cold-formed to preclude the possibility of the thermoplastic liner flowing during operation at elevated operating temperatures and to provide a secondary seal at all operating temperatures to which the coupling is exposed. The components, particularly the O-ring and fitting elements, being seized relative to one another to minimize flow of the inner liner at elevated operating temperatures and to maintain the O-ring as a live seal under all operating conditions.

14 Claims, 1 Drawing Sheet

SWAGED-TYPE FLEXIBLE HOSE COUPLING

TECHNICAL FIELD

The present invention relates generally to hose fitting assemblies and more particularly to such assemblies which are designed for use in high pressure fluid conducting systems such as automotive air conditioning systems.

BACKGROUND OF THE INVENTION

Reinforced flexible hose has long been in use in interconnecting various components of automotive air conditioning systems. Typically, these hoses have been provided with nipples or fittings which include an end portion insertable within the end of the flexible hose and a sleeve surrounding the end portion of the hose which is radially compressed or crimped to clamp the hose between the sleeve and end fitting. In order to increase the mechanical strength of the coupling as well as to increase the sealing capability thereof, a plurality of annular ribs are often provided on the fitting.

More recently, a composite type reinforced hose material has been developed which offers significant advantages over previous types of reinforced hose constructions in terms of cost, weight and lower permeability to refrigerants commonly utilized in automotive air conditioning systems, such as those comprising chlorofluorocarbons and sold under the trademarks Freon 12 and Freon 134A of E.I. DuPont. Typical refrigerants used, which are anticipated for use with the present invention as well, include those disclosed in U.S. Pat. No. 4,758,366, the teachings of which are incorporated herein by reference. This composite hose includes an inner liner fabricated from a thermoplastic material such as polytetrafluoroethylene which is characterized by its low memory characteristics and low resistance to compression setting. While this hose construction is less costly to manufacture and is lighter in weight, the presence of the liner material renders previous methods of forming fluid-tight seals with fittings relatively unacceptable due to the poor resistance to compression set of the liner material which increases the tendency for leakage to occur. Specifically, when presently known methods are employed to secure end fittings to such composite type hose, the compressive forces initially created by the crimped sleeve are relieved or reduced because the liner material tends to flow at the higher operating temperatures normally incurred. This in turn reduces the sealing effect and may result in discharge of the refrigerant as a gas. The normal operating temperatures encountered by such hose assemblies employed in automotive air conditioning generally ranges from about −20° F. to about 250° F. Design specifications require that such hose assemblies operate equally well at temperature ranges of −40° F. to 300° F. The higher temperatures are due mainly to the location of the system proximate the engine as well as from the heat generated in compressing the gas.

Thus for effective long-term sealing, one can not rely completely on a mechanical locking of the thermoplastic liner, such as shown for example in U.S. Pat. Nos. 4,106,526; 4,111,469; 4,142,554; 4,305,608; and West German Patent No. 1,164,770.

Rather, it is known to supplement the mechanical locking system as referred to above with a secondary sealing system in the form of a resilient sealing member. Examples of such a hose assembly are shown in U.S. Pat. Nos. 2,453,997; 2,797,111; 3,578,360; 3,990,729; 4,039,212; and United Kingdom Patent No. 1,083,741.

However, none of the aforementioned hose assembly sealing systems address completely and meet effectively and economically the stringent current requirements for automotive air conditioning hose assemblies which require in effect, that there be no leakage of refrigerant gas from the system for up to 12 years.

SUMMARY OF THE INVENTION

The present invention meets these above mentioned requirements. It does so by utilizing an extremely effectively designed primary "live" sealing system employing an O-ring together with an equally effective mechanical locking system whereby (i) the liner is precluded from flowing to any such degree that will affect the primary seal and (ii) the tendency of the liner to flow or expand at increasing operating temperatures will result in maintaining an effective secondary seal at the mechanical locking system.

The present invention includes an improved fluid coupling assembly, particularly adapted for a motor vehicle air conditioning system, comprising a flexible hose including an inner liner portion fabricated of resilient gas impermeable thermoplastic material, a tubular fitting having an end portion received within one end of said liner, and a sleeve member surrounding the outer surface of said hose, the end portion includes a plurality of axially spaced annular ribs, each rib having a constant outer diameter substantially equal to that of the fitting and preferably being of substantially equal width. Preferably, the annular ribs are substantially equally spaced relative to one another along the axis of the fitting. The annular ribs include a pair of sealing ribs and an annular sealing groove disposed between the pair of sealing ribs with the sealing groove having a predetermined depth to provide a preselected degree of compression upon assembly. The sealing ribs include opposing sidewalls which define the width of the sealing groove. An annular resilient sealing member is fitted within the sealing groove and engages the inner surface of the liner. The sleeve is radially inwardly deformed at a plurality of axially spaced substantially annular locations to provide radially inwardly directed annular locking ribs which exert a clamping force on the hose to thereby secure the hose on the fitting. The resilient sealing member is centrally axially located between a pair of sleeve locking ribs, while the fitting sealing ribs provide a means for dissipating the clamping force exerted by the sleeve locking ribs whereby the compression of said resilient seal member will be substantially unaffected.

Thus, the present invention provides an extremely economical and efficient means by which the advantages offered by the thermoplastically lined composite hose material may be realized in high pressure fluid environments such as automotive air conditioning systems. Additionally, the present invention is also well suited for use in conjunction with economically securing fittings to the ends of other types of tubes and fluid conduits, especially those exhibiting low memory and low resistance to compression set characteristics.

Additional advantages and features of the present invention will become apparent from the subsequent description and the appended claims taken in conjunction with the accompanying drawings.

BEST MODE FOR CARRYING OUT THE INVENTION

Figure 1:
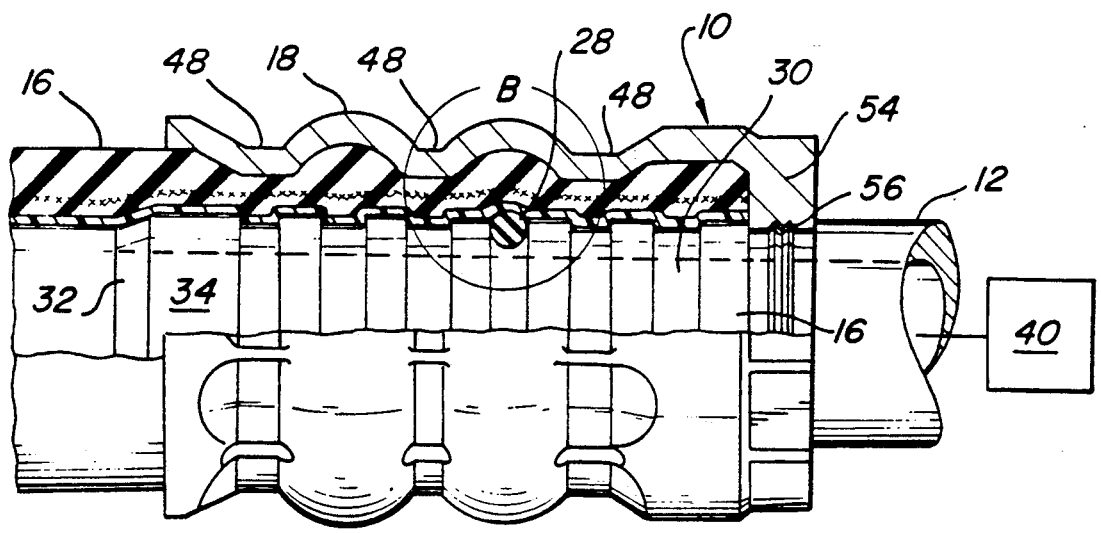
FIG. 1 is an elevation view of a hose connection assembly in accordance with the present invention shown partially in section.
Figure 2:
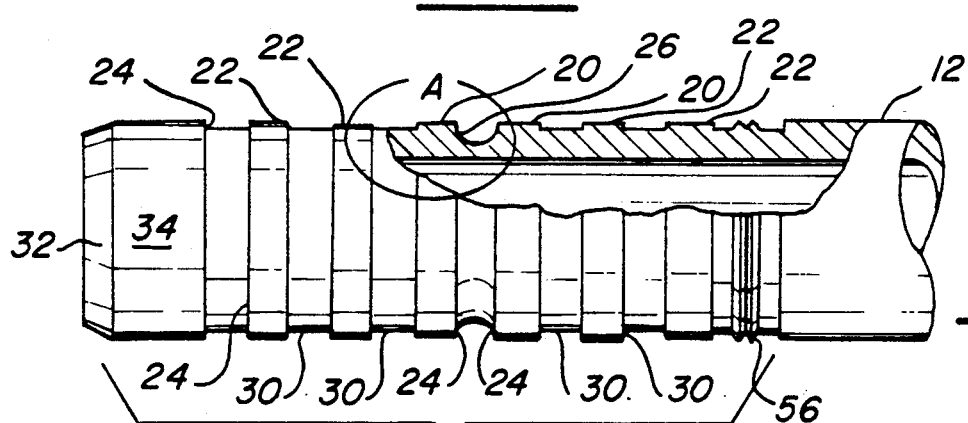
FIG. 2 is an elevation view of the tube end portion of the hose connection assembly of FIG. 1.

Referring now to the drawings and in particular to FIGS. 1 and 2, there is shown an improved hose connection assembly in accordance with the present invention being indicated generally at 10. The hose connection assembly 10 includes a fitting 12 having an end 14 received within an end section of a hose 16. A sleeve 18 is fixed at one end to the fitting 12. The remainder of sleeve 18 overlies the hose 16 for substantially the full length of end 14 and is crimped in a manner described below about the hose to secure and seal the connection.

Figure 3:
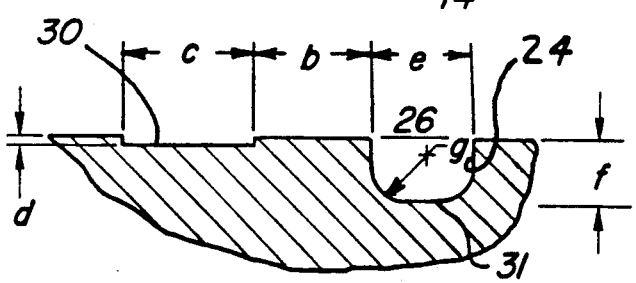
FIG. 3 is an exploded partial view of the segment designated A in FIG. 2.

As shown particularly in FIGS. 2 and 3, the fitting end 14 comprises an elongated generally cylindrical body portion having a plurality of spaced annular radially outwardly extending ribs 20,22 provided on the outer surface thereof adjacent one end. Each of the ribs is defined by sidewalls 24 extending substantially perpendicularly to the longitudinal axis of fitting 12. A taper of no more than 5° is satisfactory and can be particularly useful where the ribs 20,22 are to be roll-formed Disposed between ribs 20, which constitute sealing ribs, is an annular sealing groove 26 which is adapted to receive and retain in position a resilient sealing member preferably in the form of an O-ring 28. Disposed between each of the ribs 20,22 on opposite sides of the sealing groove 26 are locking grooves 30.

Each of the ribs 20,22 are of equal diameter to that of the nominal diameter of the fitting 12. The fitting end may therefore by machined or roll formed. If roll formed, it is desirable that the outside diameter of the ribs be held as closely as possible to that of the remainder of the fitting 12.

At the extreme end of the fitting, there is formed a transition member which includes a tapered end portion 32 and a guide surface 34 having the same outside diameter as that of the ribs 20,22.

The other end portion (not shown) of fitting 12 will be of conventional construction and may include for example an elongated hexagonal shaped portion suitable for engagement by a wrench followed by a plurality of stepped shoulders and a threaded portion adapted to sealingly mate with another portion of the automotive air conditioning system, generally designated 40, or such other structure desired to effect a connection with other portions of the system in which the assembly is to be utilized.

Hose 16, as shown, is of the composite reinforced type and includes an outer layer 42 typically of a suitable synthetic rubber material such as styrene butadiene, and the like, with an intermediate layer of suitable reinforcing material such as a braided fiber material 44 such as nylon or polyester fabric or the like disposed therebetween. An inner liner 46 is also provided which is fabricated from a suitable thermoplastic material such as for example nylon, Teflon, which is a registered trademark of E.I. DuPont, polyethylene or other similar material. It is the presence of this liner material which both affords the aforementioned advantages to this type of hose construction and also gives rise to the problems mentioned in effecting a long lasting, durable and economical fluid-tight seal.

Hose 16 is secured to fitting 12 by a deformable cylindrical sleeve member 18 surrounding the end portion of the hose and adapted to be swaged, crimped or otherwise radially inwardly compressed at a plurality of axially spaced locations 48 therealong so as to clamp hose 16 between fitting 12 and compressed sleeve member 18. As clamped, there will be formed at each of the crimp locations 48 a radially inwardly directed crimp rib 50 and a centrally located crown 52 between each crimping 48. It will be noted that each of the crimp ribs 50 are disposed directly above a respective locking groove 30 and that the primary sealing element 28 is located directly under one of the crowns 52. It will also be noted that the axial extent of the crimp at locations 48 is nearly equal to the width of the locking grooves so as to provide a crimp rib having an apex nearly equal in axial length to that of each locking groove.

To assemble the present invention, the O-ring 28 is first expanded and positioned within groove 26 where a portion thereof will extend radially beyond the sealing ribs 20 depending upon the degree of compression designed into the coupling. Thereafter, hose 16 is slid onto fitting 12. Preferably, the inside diameter of the hose will be slightly less than the outside diameter of the fitting and thus the liner 46 will be placed in tension when it is assembled to the fitting. As the hose 16 is slipped onto the fitting, its end portion will be expanded by fitting transition portion 32. The guide surface 34 will then guide the hose over the ribs 20,22 and the sealing element 28 with minimum interference. Due to the fact that the hose end is slightly flared, and that the annular sealing groove is deep relative to the cross-section of the O-ring, the O-ring will be substantially compressed within sealing groove 26 by the liner, thus allowing it to pass over the sealing element. As the liner 46 does so, the sealing element will then be at its desired compression. The liner will not have receded within the annular sealing groove nor will it have been appreciably radially expanded by the sealing element beyond the outer diameter of ribs 20,22. In fact, in those instances when the percentage fill is selected to be between 85% to 100%, the device will not be radially expanded to any appreciable degree, if at all. As explained fully below, this diametric relationship will be retained after installation such that the design compression of the primary sealing element can be closely maintained.

Next, sleeve member 18 is positioned in overlaying relationship to the portion of the hose 16 within which fitting end 14 is received. Sleeve 18 is thereafter deformed at a plurality of annular locations 48. As seen best in FIG. 4, the compressive force F exerted at each crimp rib location 50 cold forms the thermoplastic liner causing it to flow into and substantially completely fill the respective locking grooves 30. Over time, the locking grooves will become completely filled as the liner initially flows at the higher operating temperatures. At the same time, each crown 52 is held substantially to its original outside diameter. This factor, coupled with the relative resiliency of the hose outer liner 42 and the relative proportioning of the axial width b of the sealing ribs 20 and locking grooves will place the primary sealing element 28 at its designed degree of compression. The adjacent sealing ribs 20 are of sufficient axial width that any resultant compressive force being exerted upon the liner in the area mainly above the primary sealing element will be dissipated along the axial length of the sealing ribs, and thus held to a minimum. In other words, the degree of compression will be established by the relative dimensioning of the cross-sectional thickness of the O-ring relative to the cross-sectional space of the annular sealing groove.

Concurrently with or preceding the crimping of the sleeve at locations 48, the end portion 54 of the sleeve is swaged or crimped on one or more fitting locking ribs 56 which, as with the sealing ribs, have been machined or otherwise formed into the fitting.

The dimensional relationships of the coupling components, particularly axial width b of the sealing ribs 20 relative to the width c of the annular sealing groove 26, and between the depth d of the locking ribs relative to the thickness of the liner are particularly important to the effectiveness of the coupling being able to contain the refrigerant fluid or gas within the coupling over extended periods of time. Likewise, the size of the O-ring sealing element, in terms of cross-sectional diameter, relative to the inner diameter of fitting 12 is particularly important.

For example, it is important that the O-ring be fairly substantial in size to provide for substantial axial contact with liner 46 and to allow a generous tolerance in swaging the sleeve 18 onto fitting 12 without materially affecting the degree of compression obtained. Further, it is desirable that the annular sealing groove 26 have a width, designated e, only slightly greater than the width of the O-ring 28. It is also desired that the width b of the adjacent sealing ribs defining the groove be at least equal to the width of sealing groove 26. The depth f of the annular sealing groove 26 is sized less than that of the diameter of the O-ring sealing element 28 to provide the desired degree of compression of the annular sealing element.

In general, as seen in FIG. 3, the annular sealing groove is square in cross-section as viewed axially of the coupling. However, the joinder of the side walls 24 with bottom wall 31 includes a generous radius g. Radius g allows for the sealing element to be compressed to the point of completely filling the sealing groove without the sealing element being broken down as it is forced into the lower recesses of the groove 26. The exact dimensions will be established based on the degree of compression which is desired in the O-ring sealing element. More on this is explained below, however, it is generally desired that the O-ring element shall be compressed to provide at least 85% fill of the sealing groove as it is initially assembled as shown in FIG. 1.

It is also desireable that the degree of fill not exceed 120%. In other words, no more than about 20% of the cross-sectional area of the O-ring should extend radially outwardly of the sealing groove. This upper limit assures that (i) the O-ring will not roll out of the groove on assembly; and (ii) the seal will be maintained axially within the sealing groove on assembly without shearing or otherwise degrading the O-ring.

The depth d of the locking grooves 30 is sized in accordance with the thickness of the liner 46. It is generally desired that the depth d be no more than about ½ of the thickness of the liner and no less than about 1/6 of the thickness of the liner.

As an example of a specific embodiment of the present invention, there is provided the following for a ½ inch hose coupling assembly:

Material Specifications
  Fitting 12: 3000 Series Aluminum
  Sleeve 18: 3000 Series Aluminum 6000 Series Aluminum and Steel are also acceptable, as is 5000 Series Aluminum for the sleeve only
  Hose 16: Goodyear 3E782-200
  O-Ring 28: Fluorocarbon Corporation R208
Dimensional Specifications
  Hose
    Outer Diameter: 0.930 inches
    Inner Diameter=0.406 inches
    Liner Thickness: 0.01 inches
  Fitting
    Number of ribs 20,22: 6
    Width b of ribs 20: 0.095 inches
    Depth d of ribs 22: 0.006 inches
    Width c of locking grooves 30: 0.095 inches
    Depth f of sealing groove 26: 0.056 inches
    Width e of sealing groove 26: 0.080 inches
    Radius g of sealing groove 26: 0.016 inches; which may be increased to 0.04 inches to accommodate sealing groove fill in excess of 100%.
  O-Ring
    Inner diameter: 0.477 inches
    Cross-sectional diameter: 0.074 inches
    Degree of compression: 24%
    Percentage sealing groove fill: 88%

From the foregoing example, it will be noted that the relative ratios of certain design factors are as follows:
  Ratio of sealing rib width b to locking groove width c: 1 to 1;
  Ratio of sealing rib width b to sealing groove width e: 1.2 to 1;
  Ratio of liner 46 thickness to locking groove depth d: 1.7 to 1;
  Designed O-ring compression: 24%

As concerns the above ratios, and particularly as concerns the ratio of the liner thickness to the locking groove depth, this may range from about 6:1 to about 2:1. Conventional liner thicknesses may range from 0.005 inches to about 0.100 inches. The trend is to use the thinner liners. The concern in establishing the locking groove depth is that it be sufficient to effectively inhibit the flow of the thermoplastic liner at elevated operating temperatures, and yet, be not so deep as to cause a tear in the thermoplastic liner during the installation process or subsequently in use.

In establishing the width of the ribs, at least those that define the annular sealing groove, it is important that they be sufficiently wide or of sufficient axial extent, such that they dissipate the clamping forces on the liner immediately above the primary sealing element. A ratio of about 1:1 or greater, i.e. 1.2:1, has been found satisfactory for this purpose. Likewise, the width of locking grooves 30 must be sufficient to allow complete deformation of the liner 46 into the groove upon application of compressive force F during crimping. A width c equalling or near that of the sealing rib width b has been found to be satisfactory.

As for the designed degree of O-ring compression, an acceptable range lies between 10% and 35%. However, the preferred range is 20-25%. The degree of O-ring compression is defined as the difference of the initial uncompressed diameter of the O-ring less the radial length to which such diameter is reduced, i.e. the minor diameter, when the hose is installed and clamped by sleeve 18 divided by the initial uncompressed diameter of the O-ring (and multiplied by one hundred to state the product as a percentage). At 100% sealing groove fill or less, this radial length will equal the groove 26 depth.

Figure 5:
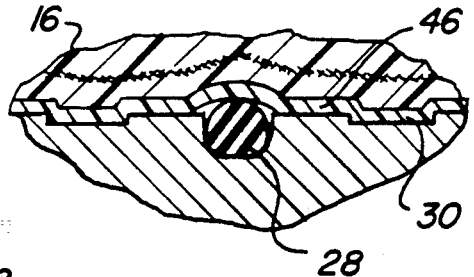
FIG. 5 is an exploded partial view of the segment designated B in FIG. 1 showing the primary resilient seal at a higher temperature condition.
Figure 4:
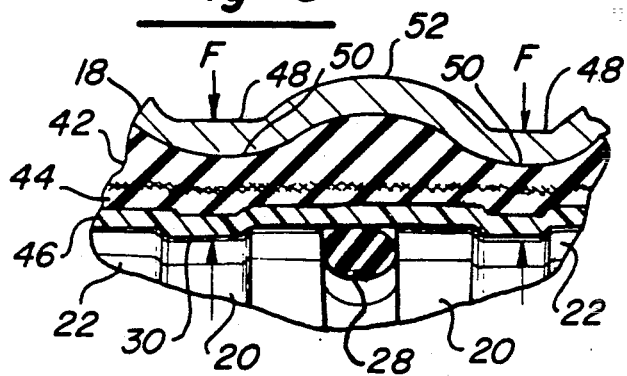
FIG. 4 is an exploded partial view of the segment designated B in FIG. 1 showing the primary resilient seal as assembled and at ambient temperature conditions.

In operation, as seen particularly in FIG. 5, the liner 46 will have a tendency to flow at the higher temperatures in the order of 220° F. to 300° F. Thus, the primary sealing element will be allowed to expand thereby lifting the thermoplastic liner 46 from the surface or a portion of the surface of the adjacent sealing rib 20. Upon the temperature receding to the lower level of the operating range, liner 46 will assume its initial shape, or nearly so, as shown in FIG. 4. Throughout the operating temperature of the coupling, the liner and O-ring will expand and contract through many cycles. Due to the design of the locking grooves, particularly those adjacent the annular sealing groove 26, the liner will be precluded from growing to any appreciable extent other than that portion which extends between the two locking grooves. This is because of the effectiveness of the compressive force F exerted by the radially inwardly directed crimping ribs 50 on the liner initially cold-forming it in place to substantially fill the locking grooves and thereafter holding it under this compressive load. Any tendency of the liner to flow in the area of the locking groove will merely cause it to expand within the locking groove thus providing a more effective seal. Although the locking grooves 30 immediately adjacent each sealing rib 20 may be sufficient, the additional locking grooves shown provide added assurance.

While the best mode for carrying out the invention has been described in detail, those familiar with the art to which this invention relates will recognize alternative designs and embodiments for practicing the invention. Thus, the above described preferred embodiment is intended to be illustrative of the invention which may be modified within the scope of the following appended claims.

What is claimed is:

1. An improved hose coupling assembly, particularly adapted for a motor vehicle air conditioning system, comprising:

a flexible hose including an outer layer of rubber-like material, an intermediate layer of reinforcing material and an inner liner of deformable gas impermeable material;

a rigid tubular fitting having an end portion received within one end of said liner;

said end portion including a plurality of axially spaced annular ribs having an outer diameter substantially equal to the inner diameter of said liner, said ribs including a pair of sealing ribs;

an annular sealing groove disposed between said sealing ribs and having a base wall;

said sealing ribs including opposing sidewalls defining the width of said sealing groove;

an annular resilient sealing member fitted within said sealing groove and engaging the inner surface of said liner in compression;

a sleeve member surrounding the outer surface of said hose, said sleeve member being radially inwardly deformed at a plurality of axially spaced substantially annular locations to provide radially inwardly directed annular locking ribs which exert a clamping force on said hose to thereby secure said hose on said fitting;

said sleeve locking ribs being disposed axially outwardly of said pair of sealing ribs;

said resilient sealing member being centrally axially located between an adjacent pair of said sleeve locking ribs;

said pair of sealing ribs providing means for dissipating said clamping force whereby the compression of said resilient seal member will be substantially unaffected;

said plurality of ribs further including at least a first pair of tubular fitting locking ribs, each being disposed on opposite sides of said sealing groove and axially spaced from a respective sealing rib to provide a locking groove for locking said liner in place axially relative to said tubular fitting over an operating temperature range of up to at least about 300° F. and for sealing said liner relative to said tubular fitting over said operating temperature range to thereby preclude the passage of fluids and gases from said coupling;

each said sleeve locking rib being generally located radially opposite a respective locking groove whereby the maximum clamping force is applied directly upon said liner at the locking grooves and a minimum clamping force is directed upon said resilient sealing member; and the ratio of the thickness of said liner to the depth of each said tubular fitting locking groove ranging from about 2:1 to about 6:1.

2. The invention of claim 1 wherein said plurality of ribs includes at least a pair of identically constructed tubular fitting locking ribs disposed on each side of said sealing groove, each said pair including one locking rib from said first pair of locking ribs and one said locking groove disposed therebetween.

3. The invention of claim 2 wherein each said locking groove includes a base of constant diameter and having opposing sidewalls thereof disposed substantially perpendicular to the axis of said fitting.

4. The invention of claim 3 wherein said liner thickness is no greater than about 0.01 inches and the ratio of the thickness of said liner to the depth of each said tubular fitting locking groove is about 2:1; and the axial length of each of said tubular fitting locking ribs, said locking grooves and said sealing ribs being approximately equal to one another and no less than the axial length of said sealing groove, thereby assuring a maximum crimping force is exerted on the liner within the locking grooves and a minimum crimping force is allowed to disturb the sealing effect of the O-ring within the sealing groove.

5. The invention of claim 4 wherein said resilient sealing member is an O-ring of preselected size such that upon final assembly said O-ring will be compressed to a value ranging from about 10% to no more than about 35% of the unstressed O-ring.

6. The invention of claim 5 wherein said O-ring fills from 85% to 100% of the volume of said sealing groove.

7. The invention of claim 6 wherein the base wall of said sealing groove at the juncture thereof with said opposing sidewalls of said sealing ribs is contoured at a radius substantially equal to the cross-sectional radius of said O-ring, whereby deformation of said O-ring is substantially limited to the portion of the O-ring which is in contact with said liner.

8. The invention of claim 1 wherein said resilient sealing member is an O-ring of preselected size such that upon final assembly said O-ring will be compressed to a value ranging from about 10% to no more than about 35% of the unstressed O-ring.

9. The invention of claim 1 wherein said O-ring fills from 85% to 100% of the volume of said sealing groove.

10. The invention of claim 1 wherein said liner is a thermoplastic material ranging in thickness from 0.005 inches to 0.100 inches.

11. An improved hose coupling assembly, particularly adapted for a motor vehicle air conditioning system, comprising:
 a flexible hose including a portion constituting a liner of deformable gas impermeable thermoplastic material;
 a tubular fitting having an end portion received within one end of said liner;
 said end portion including a plurality of axially spaced annular ribs having an outer diameter substantially equal to that of said fitting, said liner being in slight interference fit with said ribs upon initial insertion of the liner onto said end portion, said ribs including a pair of sealing ribs, each said sealing rib being of substantially equal axial width;
 an annular sealing groove disposed between said sealing ribs and having a base wall;
 said sealing ribs including opposing sidewalls defining the width of said sealing groove and having an axial width at least equal to the width of said sealing groove;
 an annular resilient sealing member in the shape of an O-ring fitted within said sealing groove and engaging the inner surface of said liner upon initial insertion of the liner onto said end portion in compression to a value ranging from about 10% to no more than about 35% of the unstressed O-ring, said O-ring filling at least 85% of the volume of said sealing groove upon initial insertion of the liner onto said end portion;
 a sleeve member surrounding the outer surface of said hose and fixed to said fitting, said sleeve member being radially inwardly deformed at a plurality of axially spaced substantially annular locations to provide radially inwardly directed annular locking ribs which exert a clamping force on said hose to thereby secure said hose on said fitting;
 said sleeve locking ribs being disposed axially outwardly of said pair of sealing ribs;
 said plurality of ribs further including at least a first pair of tubular fitting locking ribs, each being disposed on opposite sides of said sealing groove and axially spaced from a respective sealing rib to provide a locking groove and thereby providing a liner retaining means for locking said liner in place axially relative to said tubular fitting over an operating temperature range of up to at least about 300° F. and for sealing said liner relative to said tubular fitting over said operating temperature range to thereby preclude the passage of fluids and gases from said coupling;
 said resilient sealing member being centrally axially located between an adjacent pair of said sleeve locking ribs;
 said pair of sealing ribs providing means for dissipating said clamping force whereby the compression of said resilient seal member will be substantially unaffected, and
 each said sleeve locking rib being generally located radially opposite a respective locking groove whereby the maximum clamping force is applied direction upon said liner at the locking grooves and a minimum clamping force is directed upon said resilient sealing member.

12. The invention of claim 11 wherein said resilient sealing member is an O-ring of preselected size such that upon final assembly said O-ring will be compressed to a value ranging from about 20% to no more than about 25% of the unstressed O-ring.

13. The invention of claim 11 wherein the base wall of said sealing groove at the juncture thereof with the opposing side walls of said sealing ribs is contoured at a radius substantially equal to the cross-sectional radius of said O-ring whereby deformation of said O-ring is substantially limited to that portion of the O-ring which is in contact with said liner.

14. The invention of claim 11 wherein said hose includes an outer layer of synthetic rubber material, and said outer layer includes an intermediate annulus of a reinforcing material.

* * * * *